June 19, 1956 — E. K. KUHLES ET AL — 2,751,123
PORTABLE VACUUM TANK
Filed March 29, 1952 — 4 Sheets-Sheet 1
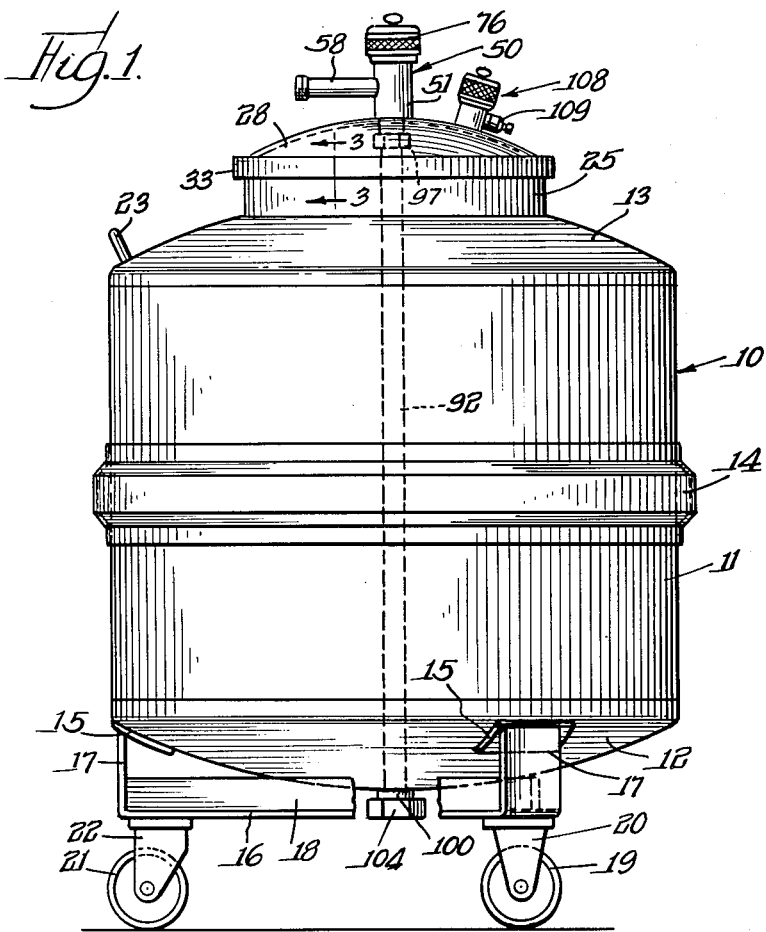
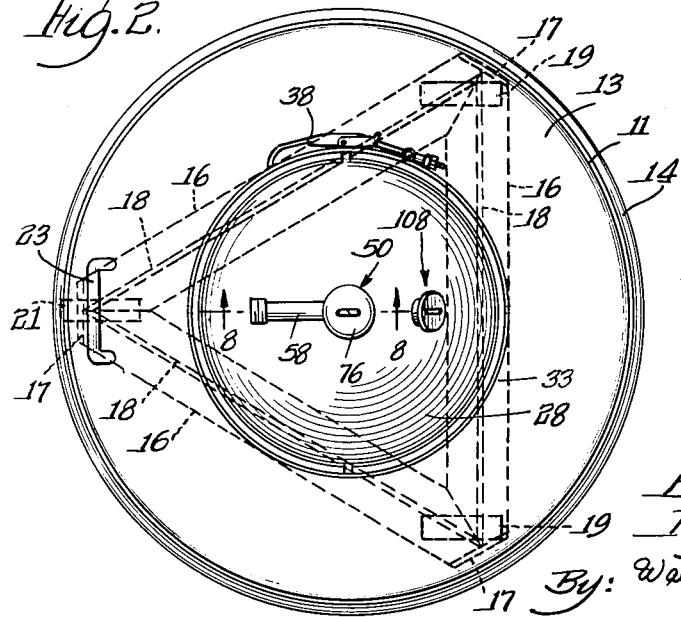
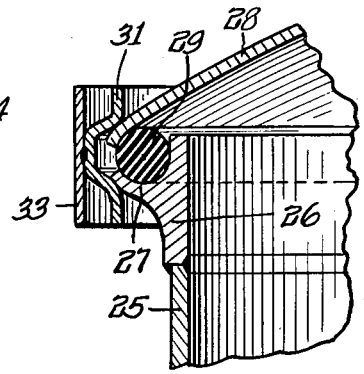
INVENTORS
Edward K. Kuhles
Roy R. Graves
By Wallenstein & Spangenberg
Attys.

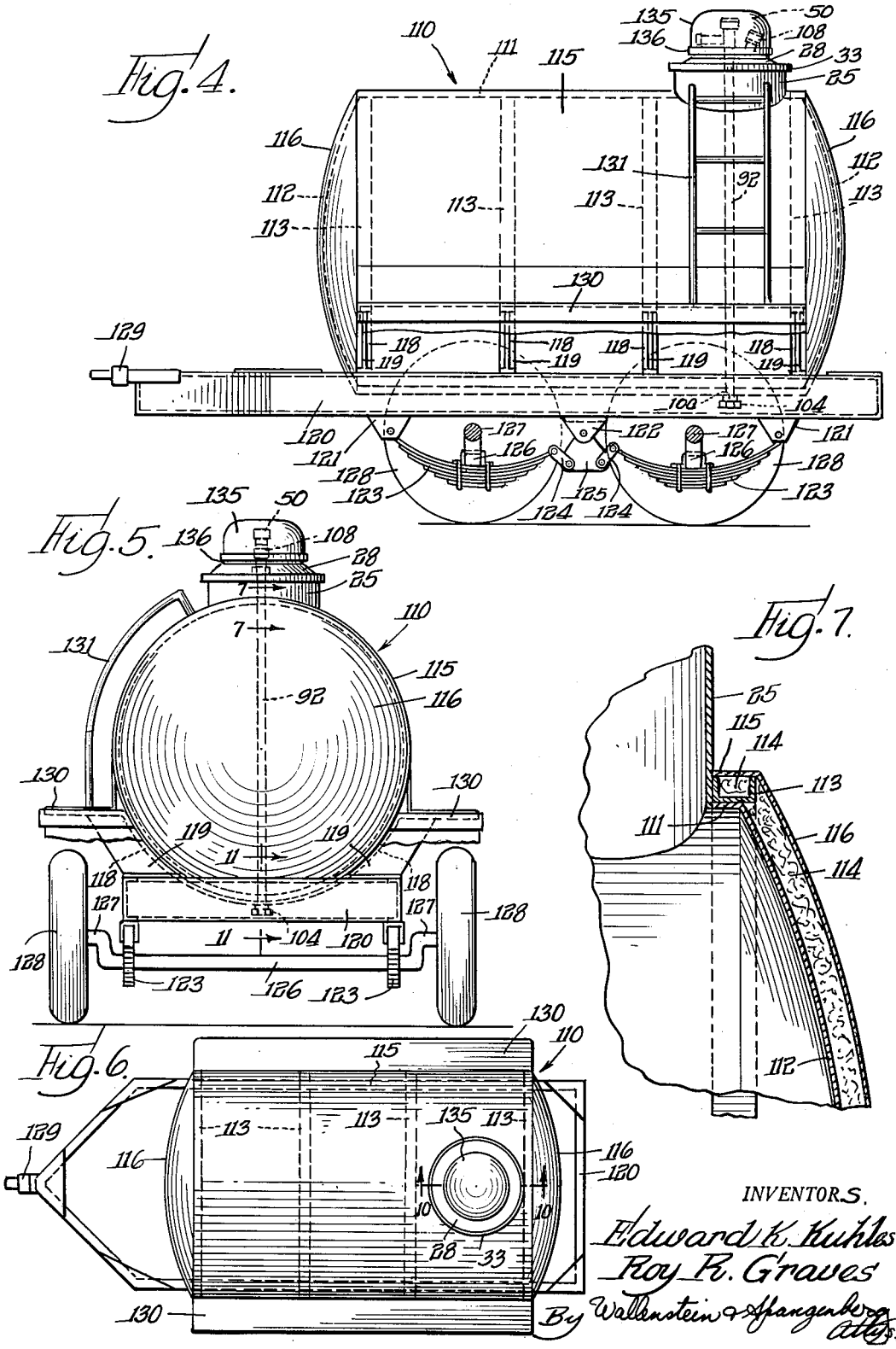

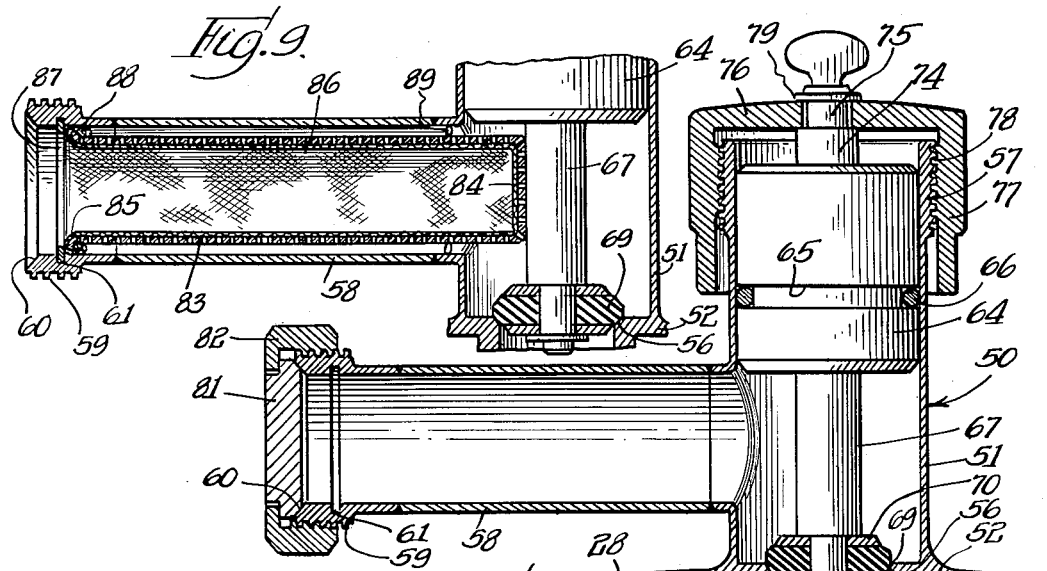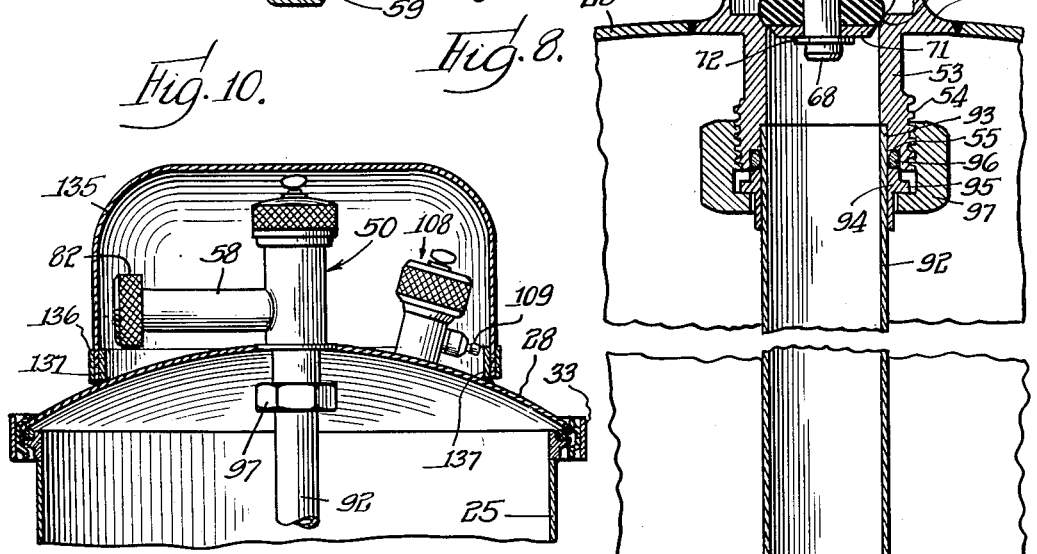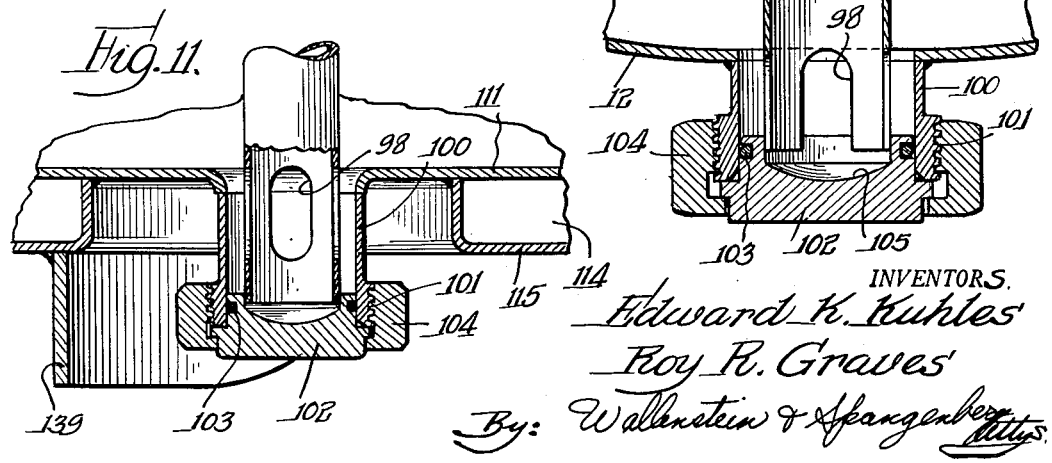

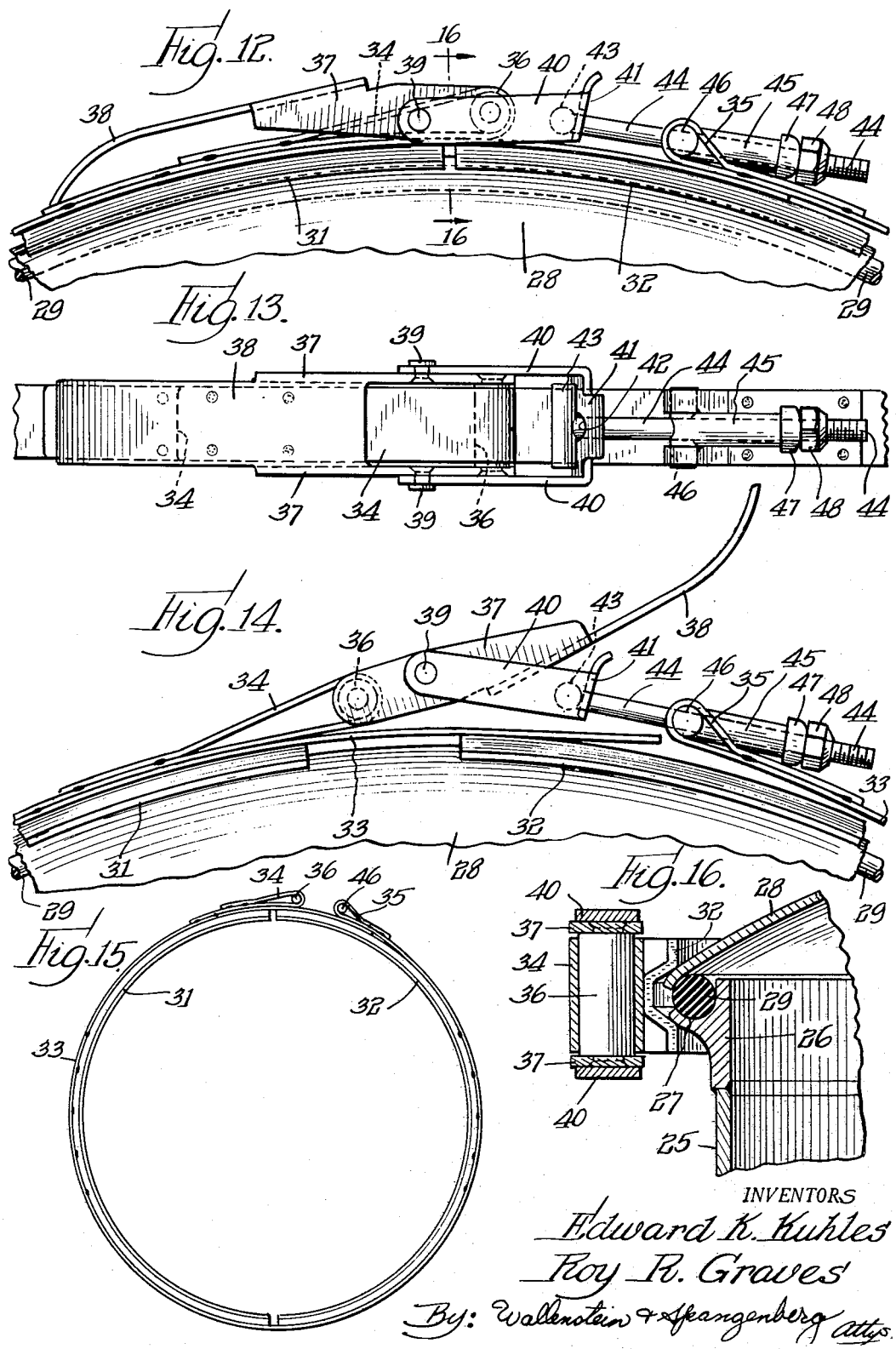

United States Patent Office 2,751,123
Patented June 19, 1956

2,751,123

PORTABLE VACUUM TANK

Edward K. Kuhles, Wilmette, Ill., and Roy R. Graves, Valparaiso, Ind., assignors to The Graves-Stambaugh Corporation, a corporation of Delaware Application March 29, 1952, Serial No. 279,386

9 Claims. (Cl. 222—176)

This invention relates to portable vacuum tanks for transporting liquids out of contact with air.

The principal object of this invention is to provide an improved portable vacuum tank which is particularly useful for transporting liquids, such as milk, out of contact with air, which may be sealed against atmospheric conditions, which permits ready cleaning and scrubbing of the interior thereof, which may be readily sterilized, which withstands high vacuum and high pressure, which may be readily filled with liquid, such as milk, under vacuum, in which the liquid may be readily withdrawn therefrom under vacuum, which is supported by a carriage having wheels for easy transportation and handling, which is simple in construction and convenient to manipulate, and which is inexpensive to manufacture.

While the portable vacuum tank of this invention is of general utility for transporting out of contact with air substantially any liquid, it is particularly useful for so transporting milk and the like, such as milk being processed in accordance with the teachings of the copending applications of Roy R. Graves, Ser. No. 95,225, filed May 16, 1949, now Patent No. 2,616,809, and Ser. No. 259,211, filed November 20, 1951, now Patent No. 2,661,476. Briefly, the process disclosed in these copending applications comprises, at the farm, withdrawing milk from cows without contact with air by means of milking machines, collecting the withdrawn milk from each cow in a weigh jar without contact with air, weighing and inspecting the milk in the weigh jars, and collecting the raw milk from the weigh jars in a portable vacuum tank without contact with air and at substantially body temperature. This withdrawing and collecting of the milk at the farm without contact with air is accomplished in enclosed lines or pipes utilizing vacuum. The portable vacuum tanks from one or more farms are then promptly transported without substantial cooling to a central processing plant where the milk therein is weighed and collected without contact with air in processing tanks. This milk in these processing tanks, which has not been contacted by air nor subjected to substantial prior cooling, is then withdrawn therefrom in the absence of air, homogenized, rapidly heated at least to pasteurization temperatures or sterilization temperatures and cooled and sealed in suitable containers. The milk processed in this manner in a completely closed system has all of the characteristics and attributes of fresh milk and may be kept over long periods of time. In fact, when the milk is sterilized and packaged in cans, it keeps substantially indefinitely without refrigeration.

The portable vacuum tank of this invention is so constructed to make it suitable for use in so collecting the milk at the farm and transporting the same to the central processing plant all without contact with air. It is sturdy, it handles high vacuums and pressures, it is readily manipulated, it is readily filled and emptied, and it is readily scrubbed, cleaned and sterilized.

Briefly, the portable vacuum tank of this invention includes a tank having a bottom wall provided with a well and a top wall provided with a manhole above the well, a manhole cover for the manhole, and means for removably securing and sealing the manhole cover to the manhole. When the manhole cover is removed, the interior of the tank may be readily scrubbed and cleaned, and when the manhole cover is sealed closed, the tank is positively sealed from the atmosphere. A milk valve is carried by the manhole cover above the well and it is provided with a tube extending downwardly into the well. The valve and tube supply milk to and withdraw milk from the tank by making suitable external connections to the valve. Milk is supplied to the tank by creating a vacuum in the tank and is withdrawn from the tank by applying a vacuum to the valve. A second valve is also carried by the manhole cover. It is used for connection to a source of vacuum for applying vacuum to the tank. It is also used for connection to a source of steam for sterilizing the interior of the tank with steam following scrubbing and cleaning thereof.

Since the two valves and tube are carried by the removable manhole cover, they also may be readily cleaned and sterilized. The well in the bottom wall of the tank may be formed by an open ferrule closed with a cap, so that when the cap is removed the well may be readily cleaned and the tank drained. The tank is supported by a carriage having wheels for easy manipulation.

In one form of the invention the tank is vertically arranged and substantially cylindrical in shape and having outwardly dished top and bottom walls. A bumper band is secured to the cylindrical wall for reinforcing and protecting the same. A substantially triangular shaped carriage is secured to the bottom wall and is provided with a swivel caster wheel and a pair of stationary caster wheels. This is a smaller sized tank having about 100 gallon capacity and may be readily pushed around. It will handle the milk from an average herd of cows. For transport to and from the central processing tank it is carried by a truck.

In another form of the invention the tank is also substantially cylindrical in shape but is horizontally arranged, the end walls being outwardly dished. This tank is of larger capacity, for example 500 gallons, for handling the milk from large herds. It is supported by a carriage having wheels and may be transported to and from the processing plant by towing the same as a trailer. It has a plurality of reinforcing bands secured to the cylindrical walls for reinforcing the same and the tank may be covered with thermal insulation. Also, a dust cover may be carried by the manhole cover for enclosing the valves to protect the same from dust as the tank is being towed to and from the central processing tank.

Further objects of this invention reside in the details of construction of the portable vacuum tank and in the cooperative relationships between the component parts thereof.

Other objects and advantages of this invention will become apparent to those skilled in the art upon reference to the accompanying specification, claims and drawings in which:

Fig. 1 is an elevational view of one form of the portable vacuum tank of this invention, the smaller type which may be manually pushed around;

Fig. 2 is a top plan view of the portable vacuum tank illustrated in Fig. 1;

Fig. 3 is an enlarged partial sectional view taken substantially along the line 3—3 of Fig. 1;

Fig. 4 is a side elevational view of another form of the portable vacuum tank, the larger form which may be towed behind a truck;

Fig. 5 is an end elevational view of the portable vacuum tank illustrated in Fig. 4;

Fig. 6 is a top plan view of the portable vacuum tank of Fig. 4;

Fig. 7 is an enlarged partial sectional view taken substantially along the line 7—7 of Fig. 5;

Fig. 8 is an enlarged sectional view through the valve and well taken substantially along the line 8—8 of Fig. 2;

Fig. 9 is a partial sectional view similar to a portion of Fig. 8 but showing a strainer associated with the valve;

Fig. 10 is an enlarged sectional view through the manhole cover of the form of the invention illustrated in Figs. 4 to 6 and taken substantially along the line 10—10 of Fig. 6;

Fig. 11 is an enlarged sectional view through the well in the portable vacuum tank illustrated in Figs. 4 to 6 and being taken substantially along the line 11—11 of Fig. 5;

Fig. 12 is a partial enlarged top plan view illustrating a clamping device for the band which seals the manhole cover to the manhole;

Fig. 13 is a side elevational view of the clamping device illustrated in Fig. 12;

Fig. 14 is a view similar to Fig. 12 but showing the clamping device released;

Fig. 15 is a plan view of the ring with the clamping device removed; and

Fig. 16 is a vertical sectional view taken substantially along the line 16—16 of Fig. 12.

Referring first to Figs. 1 and 2, one form of the portable vacuum tank is generally designated at 10, this form being of smaller size, such as substantially 100 gallon capacity, and capable of being manually pushed around. It is substantially cylindrical in configuration and is vertically arranged and it includes a cylindrical wall 11 and outwardly dished bottom and top walls 12 and 13. These parts are preferably made of stainless steel and the bottom and top walls are butt welded to the cylindrical wall. These welds on the inside of the tank, as well as all other internal welds, are ground and polished and conform to 3A sanitary standards. The entire interior of the tank is provided with a #4 finish. A bumper band 14 is placed around the cylindrical wall 11 and is welded thereto by continuous welds. This bumper band serves to protect the tank from being dented by impact and also acts to reinforce the same so as to withstand relatively high vacuums and positive pressures.

The tank 10 is supported by a carriage which, as here illustrated, is substantially triangular in configuration. It is formed of three adjoining members 16 having their ends up-turned at 17 and welded to plates 15 which in turn are welded to the outwardly dished bottom wall 12. The members 16 are preferably reinforced by vertically extending members 18 suitably secured thereto. A pair of stationary caster wheels 19 are secured to the carriage by means of brackets 20. A swivel caster wheel 21 is pivotally mounted on the carriage by means of a swivel bracket 22. The stationary and swivel caster wheels so secured to the carriage support the vacuum tank and provide for ready manual pushing thereof in any desired direction. To facilitate manual handling of the tank the upper wall 13 is provided with a handle 23.

As shown more clearly in Figs. 1 and 3, the top wall 13 is provided with an annular flange 25 which may be separately formed and butt welded thereto, the flange 25 forming a manhole entrance into the tank. The flange 25 has a ring 26 secured thereto as by welding, the ring forming the manhole or opening. The ring 26 is provided with an outwardly extending flange 27. The manhole is closed by a manhole cover 28 and is sealed in place against a resilient gasket 29, preferably of circular cross section. The flanges 25, the ring 26 and the manhole 28 are also preferably made of stainless steel.

The manhole cover 28 is preferably clamped in closed and sealing relation with respect to the manhole by means of a clamping ring which is illustrated in more detail in Figs. 3 and 12 to 16. The clamping ring includes a pair of substantially semi-circular ring segments 31 and 32 which are provided with a central depression to form cam shoulders for engaging the flange 27 and the manhole cover 28. When the ring segments 31 and 32 are drawn tightly into engagement with the flange 27 and the manhole cover 28, the manhole cover 28 is securely clamped against the gasket 29 to close the manhole and seal the tank from atmosphere. The ring segments 31 and 32 are secured to a flexible band 33, as by spot welding. One end of the flexible band 33 has a loop 34 welded thereto and the other end of the band terminates in a welded loop 35. The loop 34 receives a pin 36 which is carried by a pair of arms 37 of a clamp member 38. The arms 37 also carry pins 39 to which are secured the ends of a pair of arms 40 of a second clamping member 41. The closed end of the second clamping member 41 is provided with a central hole 42. A bolt 44 extends through this hole 42 and is provided with a crosshead 43 engaging the member 41. The bolt 44 extends through a sleeve 45 which is provided with a pair of opposed pins 46 which are received in the loop 35. The sleeve 45 also carries a head 47 which is engaged by a nut 48 adjustably carried on the screw-threaded end of the bolt 44. When the clamp member 38 is moved to the position illustrated in Fig. 12, a toggle action takes place to tighten the band 33 and forcibly move the ring segments 31 and 32 into engagement with the flange 27 and manhole cover 28 for sealing the manhole cover in place. When, however, the clamp member 38 is moved to the position illustrated in Fig. 14, the clamping band 33 is released to allow the ring segments 31 and 32 to be removed from the flange 27 and manhole cover 28. In this way the manhole cover is removably secured in place and may be applied and taken off with a minimum of effort. The nut 48, cooperating with the head 47, operates to adjust the tension applied to the band 33 so as to insure a proper fit between the ring segments 31 and 32 and the manhole cover 28.

The manhole cover 28 is centrally provided with a valve generally designated at 50, as illustrated in Figs. 1, 2 and 8. The valve 50 includes a cylindrical valve housing 51 having a mounting flange 52 which is butt welded to the manhole cover 28. The valve housing 51 is provided with a downwardly extending extension 53, the lower end of which is externally provided with screw threads 54 and internally provided with a shoulder 55. The valve housing 51 is also provided with an internal conical valve seat 56 adjacent the mounting flange 52. The upper end of the valve housing 51 is provided with external screw threads 57. The valve housing 51 is further provided with a branch 58 which may be integral therewith or butt welded thereto as indicated in the drawing. The outer end of the branch 58 is externally provided with screw threads 59 and internally with a conical seat 60. The branch 58 is also provided, adjacent its outer end, with an internal groove 61.

A valve plunger 64 is slidably mounted in the cylindrical valve housing 51 and this plunger is provided with a groove 65 for receiving a resilient O-ring 66 for sealing the plunger with respect to the valve housing 51. The plunger 64 is provided with a downwardly depending valve stem 67 having a reduced portion 68. A valve member 69, preferably formed of resilient material such as rubber or the like, is mounted on the reduced portion 68 between a pair of backing washers 70 and 71, the valve member and backing washers being secured in place by a split ring 72 received in a groove in the reduced portion 68.

The upper end of the valve plunger 64 is provided with an upwardly extending extension 74 having a reduced portion 75 which receives a valve handle 76 having a depending flange 77 provided with internal screw threads 78. The valve handle 76 is held on the reduced portion 75 by a split ring 79. When the screw threads 78 of the valve handle 76 engage the screw threads 57 of the valve housing 51, the valve member 69 is drawn down tightly against the conical valve seat 56 for closing the valve. To open the valve the valve handle 76 is rotated until the screw threads are disengaged, whereupon the valve handle is lifted and the valve completely opened.

The outer end of the branch 58 may be closed by a plug 81 engaging the conical seat 60, the plug being held in place against the conical seat by a nut 82 engaging the screw threads 59 on the extension 58. The purpose of the plug 81 is to seal off the extension 58 and prevent contamination thereof while the portable vacuum tank is in transit. As shown in Fig. 9, the branch 58 may be provided with a strainer for straining the liquid, such as milk, being fed into the vacuum tank. Here a substantially cylindrical perforated strainer 83 is received in the branch 58 with the closed inner end 84 thereof engaging the valve stem 67. The open outer end of the perforated strainer 83 is flared outwardly, as indicated at 85. The perforated strainer 83 carries a flannel sock 86 on the inside thereof and the outer end of the stock may be folded over the flared outer end 85 of the strainer to hold the sock in place. Inward movement of the strainer is limited by the valve stem 67 and outward movement thereof is limited by a split ring 87 received in the internal groove 61. The strainer and sock may be sealed in place by means of a resilient O-ring 88. The inner end of the strainer 83 may be centrally located with respect to the branch 58 by suitable projections 89 formed on the strainer member. The strainer and sock may be readily inserted in the branch 58 and located in place by the split ring 87 and it may be readily removed merely by first removing the split ring 87. The strainer and its sock will prevent impurities, such as scale and the like, from entering into the tank with the milk.

Depending downwardly from the valve 50 within the tank is a tube 92, the upper end of the tube 92 being received in a counterbore 93 in the extension 53 of the valve housing 51. A ferrule 94 slidably mounted on the tube 92 is provided with a flange 95 and abuts against a resilient O-ring 96 for clamping the same between it and the shoulder 55. This clamping action is afforded by a nut 97 carried by the screw threads 54 of the extension 53. In this way the tube 92 is detachably secured and sealed to the extension 53 of the valve 50. The lower end of the tube 92 is provided with a plurality of slotted openings 98.

The lower end of the tube 92 extends into a well formed by a depending ferrule 100 welded to the outwardly dished bottom wall 12, the lower end of the ferrule being externally provided with screw threads 101. The ferrule is closed to complete the well by means of a plug 102 having an annular groove for receiving a resilient O-ring 103, the O-ring sealing the plug 102 to the ferrule 100. The plug 102 is held in place on the ferrule by a nut 104. The slotted openings 98 in the bottom of the tube 92 communicate with the well to provide passages for the supply of milk to and the withdrawal of milk from the vacuum tank. The plug 102 is provided with a central annular recess 105 into which the lower end of the tube 92 extends to support the lower end of the tube and prevent rattling and dislodgment of the same.

As shown in Figs. 1 and 2, the manhole cover 28 is also provided with another valve generally designated at 108, which is generally constructed like the valve 50 but not provided with a downwardly depending tube. It is provided with a branch 109 for receiving a hose connection for applying vacuum and steam to the interior of the tank when the valve 108 is opened.

To scrub and clean the vacuum tank, the manhole cover 28 and the parts carried thereby are removed and the plug 102 is also removed. The manhole provides ready access to the interior of the tank to allow scrubbing and cleaning of the same, the liquid utilized in so scrubbing and cleaning draining through the bottom ferrule 100. The manhole cover and the valves and depending tube, as well as the plug 102, are scrubbed and cleaned while they are removed from the tank. After the cleaning is completed the manhole cover with the parts carried thereby are secured in place, whereupon the entire unit is assembled with a tight seal between the manhole cover 28 and the tank. The plug 102 is placed on the ferrule and the nut 104 tightened, to seal the well. A hose connection leading from a source of steam is then connected to the valve 108 and the valve 108 is opened to supply steam to the interior of the tank at fifteen to twenty pounds for twenty to fifteen minutes for sterilizing the same. The nut 104 and plug 102 may be removed following steaming to allow the condensate to drain through the ferrule 100. The valve 108 is then closed and the plug 102 is secured to the bottom of the well by the nut 105. If desired, a vacuum connection may then be made to the valve 108 and the valve 108 opened for the purpose of evacuating the tank. After a predetermined vacuum is obtained in the tank then the valve 108 is closed to seal the vacuum in the tank. On the other hand, the valve 108 may be left open so as to maintain atmospheric pressure in the tank. This would prevent any danger of the tank collapsing due to cooling of the same. The strainer is inserted in the branch 58 of the valve 50 and the end of the branch 58 is closed by the plug 81. These cleaning, sterilizing and, if desired, evacuating operations all preferably take place at the central processing plant. The portable vacuum tank is then transported to the farm to be filled with milk which is withdrawn and collected from cows without contact with air in the manner disclosed in the copending applications Ser. No. 95,225 and Ser. No. 259,211. At the farm a vacuum connection is made to the valve 108 and a milk connection is made between the sanitary milk line and the branch 58 of the valve 50. The valves 108 and 50 are then opened, the tank is evacuated and the vacuum in the tank draws milk from the sanitary milk line into the tank through the valve 50 and the depending tube 92. When the milking and collecting operation at the farm is completed, the valve 50 is first closed and then the valve 108 is closed. The milk thus collected in the tank is maintained in the tank under vacuum. The connections between the valves 108 and 50 and the vacuum line and sanitary milk line are disconnected and the plug 81 is applied to the branch 58.

The tank with its milk under vacuum is then promptly transported to the central processing plant where the milk is withdrawn from the tank without contact with air into processing tanks at the processing plant. In this connection, the plug 81 is removed and also the strainer in the extension 53. A milk connection is then made between the extension 53 and the processing tank. The processing tank is under greater vacuum than the portable vacuum tank so that when the valve 50 is opened the milk will be withdrawn from the portable vacuum tank 10 into the processing tank by means of vacuum, the milk flowing through the well, the depending tube 92, the valve 50 and the branch 58. If desired, during the milk withdrawing operation a source of inert gas such as nitrogen may be connected to the valve 108 and the valve 108 is then opened to break the vacuum in the portable vacuum tank 10 with this gas. Thus, when the vacuum is broken in this manner the milk within the portable vacuum tank is blanketed with the inert gas. After all of the milk is withdrawn from the portable vacuum tank it then may be scrubbed, cleaned, sterilized and evacuated in the manner pointed out above. When the portable vacuum tank 10 is received from the farm at the processing plan the milk therein may be weighed merely by weighing the tank on a suitable scale. The portable vacuum tank 10, having a capacity of substantially 100 gallons of milk, will normally handle the milking of an average sized herd of cows and forms an extremely compact and convenient unit for handling the milking.

In cases where the milking of larger herds of cows must be handled, several portable tanks 10 may be utilized, these tanks being connected in series with each other between the vacuum line and the sanitary milk line at the farm so that they may be sequentially filled without breaking the vacuum. On the other hand, it may be desirable to utilize a portable vacuum tank of greater capacity than using a plurality of vacuum tanks of the kind described above. Such a larger capacity portable vacuum tank is illustrated in more detail in Figs. 4 to 7 and 10 and 11. Here the portable vacuum tank, generally designated at 110, is of substantially 500 gallon capacity. It includes a substantially cylindrical tank horizontally arranged having a cylindrical wall 111 and outwardly dished end walls 112. The cylindrical portions of the tank are reinforced by reinforcing bands 113 in the form of channels continuously welded to the cylindrical wall of the tank. The entire tank is preferably insulated with thermal insulating material 114, the insulating material being held in place by an outer cylindrical casing 115 and outwardly dished end casings 116. The tank 110 is supported by straps 118 which in turn are reinforced by saddles 119 secured to a carriage 120. The carriage 120 is provided with a pair of forward and a pair of rear depending brackets 121 and a central pair of brackets 122. The front and rear ends of two pairs of springs 123 are pivoted to the brackets 121 and the other ends of the two pairs of springs are pivoted to shackles 124 which in turn are pivoted to a pair of rocking plates 125, which in turn are pivoted to the brackets 122. The springs 123 carry axles 126 which are offset at 127 for rotatably carrying wheels 128. The saddles 119 may be provided with walkways 130 and a ladder 131 may be utilized for providing ready access to the manhole of the tank. The carriage 120 may be provided with a suitable trailer hitch 129 so that the portable vacuum tank of this form of the invention may be readily towed behind a truck.

The top of the tank adjacent the ladder 131 is provided with a manhole construction, including a flange 25 and a manhole cover 28 which may be of the same construction as described above in connection with the other form of the invention. The lower part of the tank is also provided with a well which is of the same construction as described above. The manhole cover 28 and its associated parts and the well are illustrated in more detail in Figs. 10 and 11 and it will be noted that the constructions here involved are substantially the same as those described above in connection with the portable vacuum tank 10. Like reference characters have been utilized for like parts. The valves 50 and 108 carried by the manhole cover 28 are preferably enclosed in a dust cover 135, the dust cover being secured in place on the manhole cover by means of a clamping ring 136 and a ring 137 welded to the manhole cover 28. Such a dust cover is desirable where the portable vacuum tank is towed behind a truck as is the case here in order to protect the valves 50 and 108 from dust raised by the truck. The bottom of the tank adjacent the well is provided with a stone guard 139 welded thereto, as illustrated in Fig. 11. The stone guard protects the ferrule 100 and plug 102 from damage by flying stones as the portable vacuum tank is being towed behind a truck. This stone guard operates to deflect any stones propelled toward the well and yet permits ready removal of the plug 102 from the ferrule 100.

Outside of the details of construction of the tanks and wheel carriages and the relative capacities of the tanks, the portable vacuum tanks 10 and 110 of this invention are substantially the same in construction and manner of use. They both may be scrubbed, cleaned, evacuated, filled and emptied in the same way. Because the portable vacuum tanks of this invention are utilized for transporting milk or the like, all parts which may be contacted by the milk are preferably made of stainless steel to prevent contamination of the milk. All internally welded joints, etc. are ground and polished to eliminate crevices and the like where contamination might take place.

While for purposes of illustration two forms of this invention have been disclosed, other forms thereof may become apparent to those skilled in the art upon reference to this disclosure and, therefore, this invention is to be limited only by the scope of the appended claims.

We claim as our invention:

1. A portable vacuum tank for transporting liquids out of contact with air comprising, a tank having a bottom wall provided with an open downwardly extending ferrule and a top wall provided with a manhole above the ferrule, the manhole and open ferrule permitting cleaning of the interior of the tank and draining the same, a removable cap for closing and sealing the ferrule to form a well, a manhole cover for the manhole, means for removably securing and sealing the manhole cover to the manhole, and a valve carried by the manhole cover above the well and having a tube extending downwardly therefrom into the well for supplying liquid to and withdrawing liquid from the tank.

2. A portbale vacuum tank for transporting liquids out of contact with air comprising, a tank having a bottom wall provided with an open downwardly extending ferrule and a top wall provided with a manhole above the ferrule, the manhole and open ferrule permitting cleaning of the interior of the tank and draining the same, a removable cap for closing and sealing the ferrule to form a well, a manhole cover for the manhole, means for removably securing and sealing the manhole cover to the manhole, a valve carried by the manhole cover above the well and having a tube extending downwardly therefrom into the well for supplying liquid to and withdrawing liquid from the tank, and a second valve carried by the manhole cover for applying steam and vacuum to the interior of the tank.

3. A portable vacuum tank for transporting liquids out of contact with air comprising, a tank having a bottom wall provided with an open downwardly extending ferrule and a top wall provided with a manhole above the ferrule, the manhole and open ferrule permitting cleaning of the interior of the tank and draining the same, a removable cap for closing and sealing the ferrule to form a well, a manhole cover for the manhole, means for removably securing and sealing the manhole cover to the manhole, a valve secured to the manhole cover above the well, and a tube detachably carried by the valve and extending downwardly therefrom into the well for supplying liquid to and withdrawing liquid from the tank.

4. A portable vacuum tank for transporting liquids out of contact with air comprising, a tank having a bottom wall provided with an open downwardly extending ferrule and a top wall provided with a manhole above the ferrule, the manhole and open ferrule permitting cleaning of the interior of the tank and draining the same, a removable cap for closing and sealing the ferrule to form a well, a manhole cover for the manhole, means for removably securing and sealing the manhole cover to the manhole, a valve secured to the manhole cover above the well, a tube detachably carried by the valve and extending downwardly therefrom into the well for supplying liquid to and withdrawing liquid from the tank, and a second valve carried by the manhole cover for applying steam and vacuum to the interior of the tank.

5. A portable vacuum tank for transporting liquids out of contact with air comprising, a tank having a bottom wall provided with a well and a top wall provided with a manhole above the well to permit cleaning of the interior of the tank, a manhole cover for the manhole, means for removably securing and sealing the manhole cover to the manhole, a valve carried by the manhole cover above the well and having a tube extending downwardly therefrom into the well for supplying liquid to and withdrawing liquid from the tank, said valve having an outer elongated connecting branch, and a substantially cylindrical strainer having a closed inner end removably mounted in the branch for straining liquid supplied through the branch into the tank.

6. A portable vacuum tank for transporting liquids out of contact with air comprising, a vertically arranged substantially cylindrical tank having a downwardly dished bottom wall provided with a well and an upwardly dished top wall provided with a manhole above the well to permit cleaning of the interior of the tank, a manhole cover for the manhole, means for removably securing and sealing the manhole cover to the manhole, a valve carried by the manhole cover above the well and having a tube extending downwardly therefrom into the well for supplying liquid to and withdrawing liquid from the tank, a reinforcing bumper band externally secured to the substantially cylindrical wall of the tank, and a carriage having wheels secured to the bottom wall of the tank for supporting the same.

7. A portable vacuum tank for transporting liquids out of contact with air comprising, a horizontally arranged substantially cylindrical tank having outwardly dished end walls, the bottom of the tank being provided with a well and the top of the tank being provided with a manhole to permit cleaning of the interior of the tank, a manhole cover for the manhole, means for removably securing and sealing the manhole cover to the manhole, a valve carried by the manhole cover above the well and having a tube extending downwardly therefrom into the well for supplying liquid to and withdrawing liquid from the tank, reinforcing bands externally secured to the substantially cylindrical wall of the tank, and a carriage having wheels and secured to the tank for supporting the same.

8. A portable vacuum tank for transporting liquids out of contact with air comprising, a tank having a bottom wall and a top wall, a ferrule in the bottom wall for draining liquid from the tank, means for sealing off the ferrule, the top wall having a manhole to permit cleaning of the interior of the tank, a manhole cover for the manhole, means for removably securing and sealing the manhole cover to the manhole, a valve at the top of the tank for supplying liquid to the tank, a second valve at the top of the tank for applying steam and vacuum to the interior of the tank, and a carriage having wheels for supporting the tank.

9. A portable vacuum tank for transporting liquids out of contact with air comprising, a vertically arranged substantially cylindrical tank having outwardly dished bottom and top walls, a ferrule in the bottom wall for draining liquid from the tank, means for sealing off the ferrule, the top wall having a manhole to permit cleaning of the interior of the tank, a manhole cover for the manhole, means for removably securing and sealing the manhole cover to the manhole, a valve at the top of the tank for supplying liquid to the tank, a second valve at the top of the tank for applying steam and vacuum to the interior of the tank, a reinforcing bumper band externally secured to the substantially cylindrical wall of the tank, and a carriage having wheels secured to the bottom wall of the tank for supporting the same.

References Cited in the file of this patent

UNITED STATES PATENTS

| Number | Name | Date |
|---|---|---|
| 718,759 | Hendrix | Jan. 20, 1903 |
| 1,043,763 | Hedenberg | Nov. 5, 1912 |
| 1,486,073 | Coates | Mar. 4, 1924 |
| 1,683,021 | Brown | Sept. 4, 1928 |
| 1,885,678 | Boyer | Nov. 1, 1932 |
| 1,915,123 | Downs | June 20, 1933 |
| 1,935,893 | Seidler | Nov. 21, 1933 |
| 1,939,906 | Lichterman | Dec. 19, 1933 |
| 2,049,977 | Ross et al. | Aug. 4, 1936 |
| 2,074,541 | Drinkwater | Mar. 23, 1937 |
| 2,285,710 | Harlow | June 9, 1942 |